Jan. 16, 1923.

H. GOLDBLATT.
COMPASS.
FILED SEPT. 3, 1920.

1,442,143.

INVENTOR
*H Goldblatt*
BY *Munn & Co*
ATTORNEYS

Patented Jan. 16, 1923.

1,442,143

UNITED STATES PATENT OFFICE.

HENRY GOLDBLATT, OF CHICAGO, ILLINOIS.

COMPASS.

Application filed September 3, 1920. Serial No. 407,935.

*To all whom it may concern:*

Be it known that I, HENRY GOLDBLATT, a citizen of the United States, and a resident of the city of Chicago, in the county of Cook and State of Illinois, have invented a new and useful Improvement in Compasses, of which the following is a full, clear, and exact description.

My invention relates to improvements in pocket compasses, and it consists in the combinations, constructions and arrangements herein described and claimed.

An object of my invention is to provide a compass by means of which the direction in which a person is facing or proceeding may be actually indicated by the needle itself, thereby eliminating any necessity for calculation or estimate, such as is necessary with the ordinary compass.

A further object of my invention is to provide a compass which may be used in the ordinary manner to indicate the north by means of the needle or which may be used to indicate by the needle the direction in which a person is facing.

Other objects and advantages will appear in the following specification and the novel features of the invention will be particularly pointed out in the appended claims.

My invention is illustrated in the accompanying drawings, forming part of this application in which—

Figure 1:
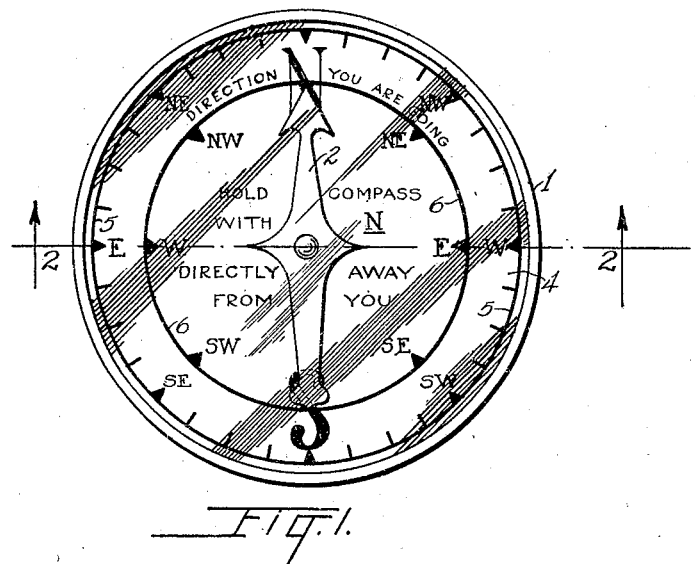
Figure 1 is a face view of the preferred form of the device.
Figure 2:
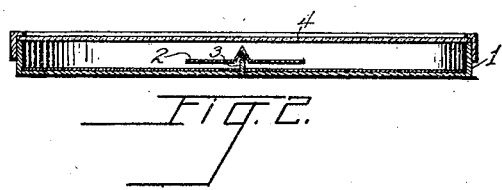
Figure 2 is a section on the line 2—2 of Figure 1.

In the drawings 1 indicates a cylindrical casing of the usual form, having a needle 2 pivotally mounted therein on a support 3. A glass cover 4 is preferably provided. The bottom of the casing 1 is provided with a dial like that indicated in Figure 1. This consists of an outer circle or ring 5 having marked thereon a scale and an inner concentric ring 6. On opposite sides of the center are the letters N and S. The outer ring is also provided with letters indicating directions such as E for east, W for west etc. The letters E and W however are not placed as on an ordinary compass dial but are transposed, that is, E is placed to the left of the needle (when the needle is in the position shown in Fig. 1) and W to the right. The letters S E, N E, S W and N W are also transposed. The inner ring is lettered, as in the ordinary compass, with E to the right of the needle when the latter is pointing to N on the dial.

Between the two circles or rings is a legend "Direction you are going", while within the inner circle is the legend "Hold compass with N directly away from you."

From the foregoing description of the various parts of the device the operation thereof may be readily understood.

Assume that it is desired to know the direction in which a person is proceeding. He holds the compass with N directly away from him, in accordance with the legend on the face of the dial. The head of the needle will then directly indicate on the outer ring the direction in which the person is facing. On the ordinary compass the needle of course indicates the north and not the direction of travel, so that it is necessary to estimate the direction. This gives rise to error which my invention obviates.

Should it be desirable to have the needle indicate the north then the inner circle or ring may be used in the ordinary manner.

I claim:

1. A compass comprising a casing, a magnetic needle pivotally mounted within the casing a dial having a pair of concentric circles imprinted thereon, and having the letters N and S to indicate north and south respectively, the outer circle being provided with the letters to the right of the median line between the letters N and S to represent westerly directions and having letters on the opposite sides of said median line to represent easterly directions, and said inner circle having the letter E on the right of the median line and registering with the letter W on the outer circle and letter W registering with the letter E on the opposite side of the median line.

2. A compass comprising a casing, a magnetic needle pivotally mounted within the casing a dial having a pair of concentric circles imprinted thereon, and having the letters N and S to indicate north and south respectively, the outer circle being provided with letters on the right of the median line between the letters N and S to represent westerly directions and having letters on the opposite side of said median line to represent easterly directions, and said inner circle having the letter E on the right of the median line and registering with the letter W on the outer circle and the letter W registering with the letter E on the opposite side of the median line, the space within the inner circle being provided with data for using the device.

3. The combination with a compass comprising a dial having letters imprinted thereon, said letters indicating the principal points of the compass in their true relation to one another, and a magnetic needle pivotally mounted on said dial, of additional letters imprinted on said dial adjacent to and on the outer side of said first named letters, said additional letters being arranged with respect to said first named letters so that the N and S, representing north and south, of both sets of letters are at common points, respectively, said additional letters on the right of a median line between said N and S letters indicating westerly directions, and said second named letters on the left of said median line indicating easterly directions.

4. The combination with a device of the character described having a magnetic needle, of a dial having a pair of concentric circles imprinted thereon, and having the letters N and S to indicate north and south respectively, the outer circle being provided with letters to the right of the median line between the letters N and S to represent westerly directions and having letters on the opposite side of said median line to represent easterly directions, and said inner circle having the letter E on the right of the median line and registering with the letter W on the outer circle, the letter W registering with the letter E on the opposite side of the median line.

HENRY GOLDBLATT.